United States Patent
Uchiyama et al.

(10) Patent No.: US 8,373,560 B2
(45) Date of Patent: *Feb. 12, 2013

(54) COMMUNICATION APPARATUS AND PORTABLE COMMUNICATION TERMINAL USING THE SAME

(75) Inventors: Jirou Uchiyama, Tokyo (JP); Shigeki Sakurai, Tokyo (JP); Masashi Yamaga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,340

(22) Filed: Jan. 10, 2012

(65) Prior Publication Data

US 2012/0105209 A1 May 3, 2012

Related U.S. Application Data

(63) Continuation of application No. 12/447,090, filed on Apr. 24, 2009, now Pat. No. 8,125,337.

(30) Foreign Application Priority Data

Oct. 25, 2006 (JP) .................................. 2006-289335

(51) Int. Cl.
*G08B 13/26* (2006.01)

(52) U.S. Cl. ........................ 340/561; 340/572.5; 343/745
(58) Field of Classification Search .................. 340/561, 340/572.5, 572.7; 343/745, 748, 893; 455/78, 455/83

See application file for complete search history.

(56) References Cited

U.S. PATENT DOCUMENTS

| | | | | |
|---|---|---|---|---|
| 5,942,977 A | * | 8/1999 | Palmer et al. | 340/572.5 |
| 6,351,215 B2 | * | 2/2002 | Rodgers et al. | 340/572.7 |
| 6,480,110 B2 | * | 11/2002 | Lee et al. | 340/572.5 |
| 6,967,623 B2 | * | 11/2005 | Hirota | 343/702 |

* cited by examiner

*Primary Examiner* — John A Tweel, Jr.

(57) ABSTRACT

When commonly using a receiving antenna and a transmitting antenna having mutually opposing characteristics, the present invention makes it possible to commonly use the antennas without deteriorating the characteristics of both antennas. In a communication apparatus including both of an RF-ID function circuit to perform contactless communication with an external reader/writer device and a reader/writer function circuit to perform contactless communication with an external RF-ID, there is disposed a common antenna shared therebetween. And, a transmitting and receiving resonance frequency switching circuit is connected in parallel to the common antenna; when selecting each function, a resonance frequency is automatically changed by the transmitting and receiving resonance frequency switching circuit.

13 Claims, 3 Drawing Sheets

Related Art

F I G. 5
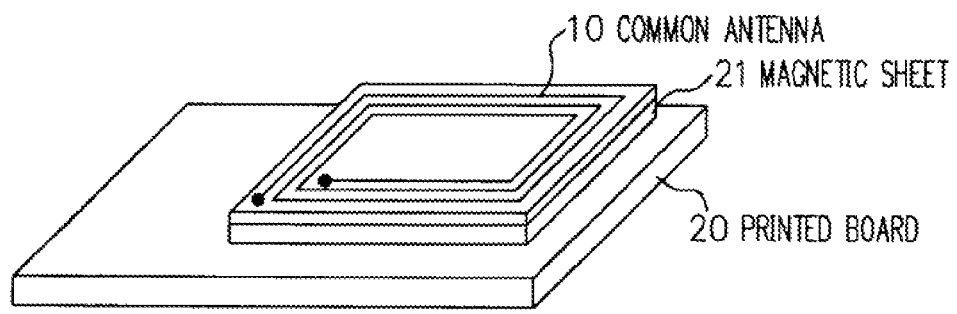
F I G. 6
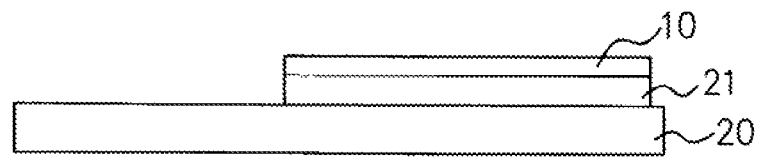
F I G. 7
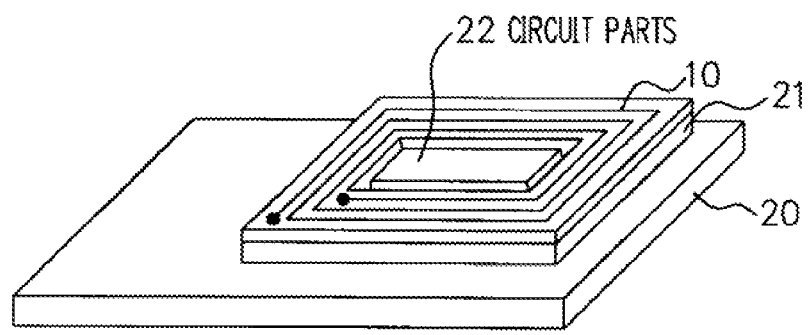
F I G. 8
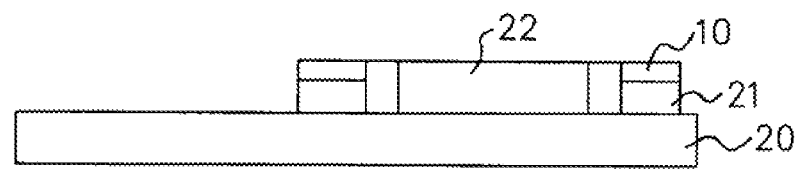

COMMUNICATION APPARATUS AND PORTABLE COMMUNICATION TERMINAL USING THE SAME

REFERENCE TO RELATED APPLICATION

This is a continuation application of U.S. patent application Ser. No. 12/447,090 filed Apr. 24, 2009 now U.S. Pat. No. 8,125,337 and claims the benefit of its priority.

TECHNICAL FIELD

The present invention relates to a communication apparatus and a portable communication terminal using the same, and in particular, to a communication apparatus including both of an RF-ID tag (IC card) function having a contactless communication function and a reader/writer function and a portable communication terminal using the same.

RELATED ART

There exists a Radio-Frequency Identification (RF-ID) device including an IC card function and a reader/writer function; FIG. 1 shows a general function block diagram of the device. Referring to FIG. 1, the RF-ID device 100 includes an IC card function circuit 1, a reader/writer function circuit 2, a control circuit 3 to control these circuits 1 and 2, a control line 4 to connect these circuits 1 to 3 to each other, a receiving antenna 5, a transmitting antenna 6, a receiving resonance frequency adjuster circuit 7, and a transmitting resonance frequency adjuster circuit The receiving antenna 5 is connected in parallel to the receiving resonance frequency adjuster circuit 7; the receiving antenna 5 and the receiving resonance frequency adjuster circuit 7 are adjusted to have a best communication distance characteristic in operation of the IC card function. Moreover, the transmitting antenna 6 is connected in series to the transmitting resonance frequency adjuster circuit 8; the antenna 6 and the transmitting resonance frequency adjuster circuit 8 are adjusted to have a best communication distance characteristic in operation of the reader/writer function.

Description will be given of data communication in the operation for the IC card (RF-ID tag) function. In communication with an external reader/writer device (not shown) installed in, for example, a ticket gate of a transport facility, received data which is modulated in a predetermined modulation scheme and which is outputted from the external reader/writer device is received via the receiving antenna 5 and is inputted to the IC card function circuit 1 to be demodulated such that required data is supplied via the control line 4 to the control circuit 3. A response from the IC card function circuit 1 to the external reader/writer device is conducted using a load modulation which is different from the modulation scheme above and which less consumes power.

Next, description will be given of data communication in the operation for the reader/writer function. In communication with an external contactless IC card (not shown), modulated data which is modulated in the predetermined modulation scheme described above is outputted from the reader/writer function circuit 2 such that data is transferred via the transmitting antenna 6 to the IC card. In operation of a response using the load modulation from the external contactless IC card, data is received via the receiving antenna 5 by the IC card function circuit 1.

In the RF-ID device 100 of this kind, to improve the communication characteristic in the IC card function, it is required to increase the area and the number of turns of the receiving antenna 5. On the other hand, to improve the communication characteristic in the reader/writer function, it is required to reduce the area and the number of turns of the transmitting antenna 6. Hence, it is necessary to independently and individually mount each of these antennas in the device 100. Specifically, referring to FIG. 2 which is a mounting plan view of the RF-ID device 100, there is employed a contour in which the transmitting antenna 6 is installed in the form of a loop on the inner side of the loop of the receiving antenna 5.

In this way, the antenna for the IC card function is mutually opposite in the characteristic to the antenna for the reader/writer function; as shown in FIG. 2, the antenna mounting area becomes larger; this hence inevitably leads to usage of a quite disadvantageous mounting scheme in recent portable communication apparatuses having a downsizing tendency.

function and a reader/writer function, an antenna is commonly used for both functions. According to this technique, in the common use of the antenna for both functions, if one of the functions is in execution, the system inhibits execution of the other function to suppress interference of radio waves to be communicated therebetween.

Patent Document Japanese Patent Laid-Open Publication Ser. No. 2006-067448

DISCLOSURE OF THE INVENTION

Problem to be Solved by the Invention

According to the technique of Patent Document 1 described above, although the structure to commonly use the antenna for the IC card function and the reader/writer function is disclosed, there has not been disclosed any specific configuration for the common use of the antennas. As above, the antennas of both functions are mutually opposite in the characteristic; hence, only by simply adopting the common use, the required RF characteristic cannot be obtained; hence, there is desired specific implementation means to commonly use the antennas without deteriorating the characteristics of both antennas.

An exemplary object of the present invention is to provide a portable communication apparatus in which when commonly using a receiving antenna and a transmitting antenna having mutually opposing characteristics, the antennas can be commonly used without deteriorating the characteristics of both antennas.

Means for Solving the Problem

A communication apparatus according to an exemplary aspect of the present invention includes: a first communication function module for performing contactless communication with an external first contactless communication device; a second communication function module including a communication function equal to a communication function of the first communication function module for performing contactless communication with an external second contactless communication device including a communication function equal to a communication function of the first contactless communication device; a common antenna shared between the first and second communication function modules; and resonance frequency switching means for changing a resonance frequency of the common antenna for each of the first and second communication function modules.

And, the resonance frequency switching means may automatically change a resonance frequency at operation of each of the first and second communication function modules.

Furthermore, the first communication module may be an RF-ID tag and the second communication module may be a reader/writer device which communicates with the RF-ID tag.

Additionally, the common antenna may be in the shape of a loop and circuit parts may be mounted in a loop of the common antenna. Moreover, the common antenna may be mounted on a printed board with a magnetic material therebetween.

Also, a portable communication terminal according to an exemplary aspect of the present invention includes the communication apparatus constructed as above.

Advantages of the Invention

A first advantage in accordance with the present invention resides in that the transmitting and receiving antenna is commonly used by disposing a transmitting and receiving resonance frequency switching function, and hence the common use can be implemented without deteriorating the respective characteristics of both antennas, and a saving of the mounting area is possible.

A second advantage in accordance with the present invention resides in that since the transmitting and receiving antenna is commonly employed, other circuit parts can be installed in open portions in the loopshaped antennas, and hence a saving of the mounting area is further enhanced.

BRIEF DESCRIPTION OF THE DRAWINGS

FIG. 5 is a perspective view showing a mounting example of the common antenna 10 in the exemplary embodiment of the present invention;

FIG. 6 is a cross-sectional view showing a mounting example of the common antenna 10 in the exemplary embodiment of the present invention;

FIG. 7 is a perspective view showing another mounting example of the common antenna 10 in the exemplary embodiment of the present invention; and FIG. 8 is a cross-sectional view showing another mounting example of the common antenna 10 in the exemplary embodiment of the present invention.

BEST MODE FOR CARRYING OUT THE INVENTION

Figure 1:
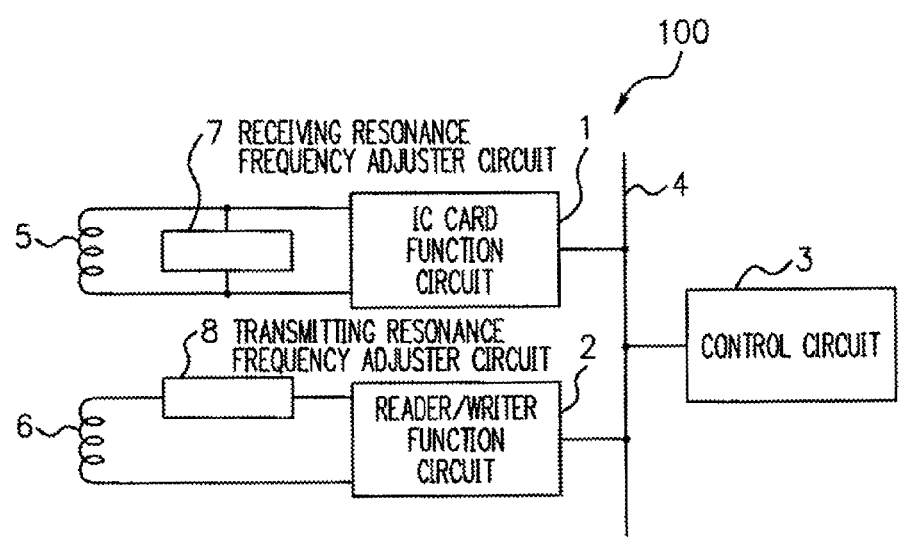
FIG. 1 is a general function block diagram showing a related art.
Figure 2:
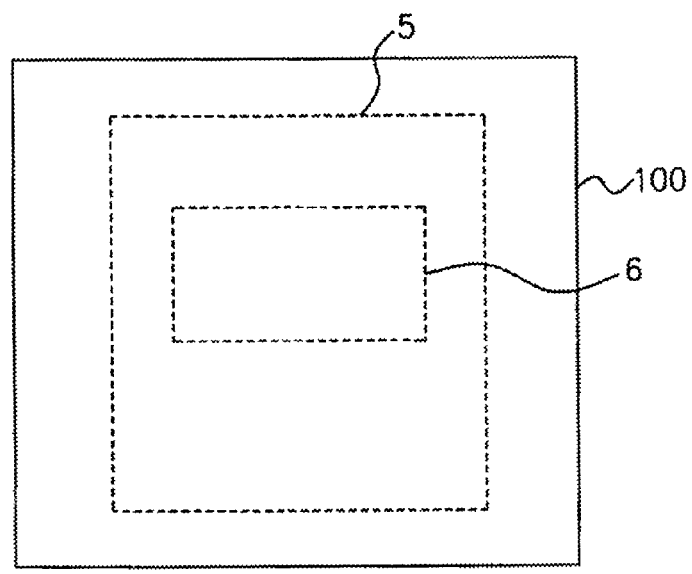
FIG. 2 is a plan view showing a mounting example of the antennas 5 and 6 of FIG. 1.
Figure 3:
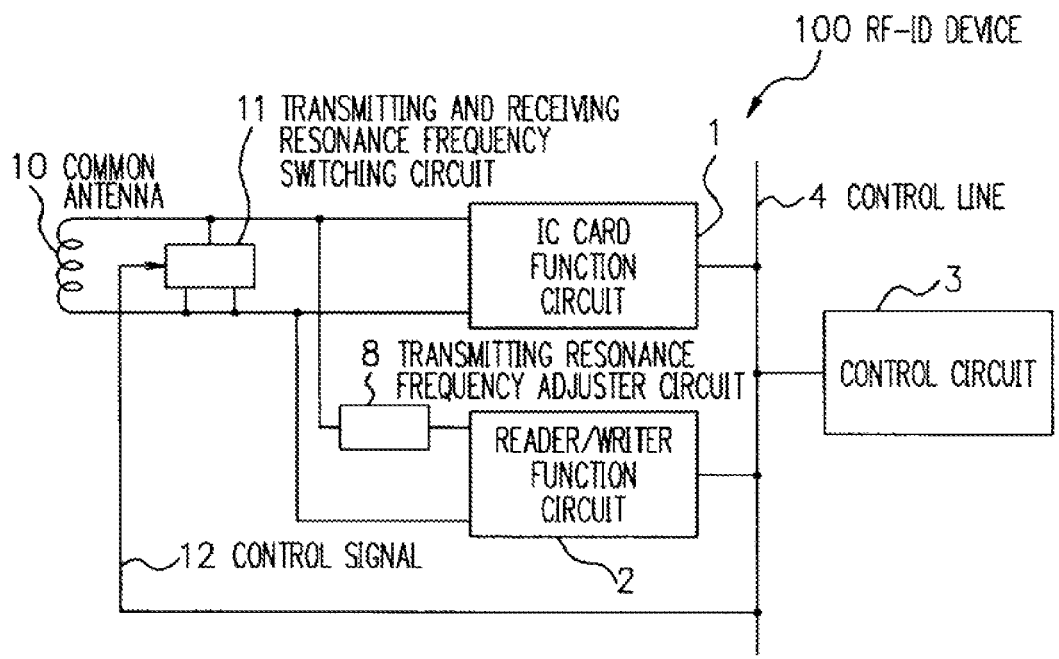
FIG. 3 is a general function block diagram showing an exemplary embodiment of the present invention.

Referring next to drawings, description will be given of an exemplary embodiment of the present invention. FIG. 3 is a general function block diagram of the exemplary embodiment, and the equivalent components as those of FIG. 1 are assigned with the same reference numerals. An RF-ID device 100 of the exemplary embodiment includes an IC card function circuit 1, a reader/writer function circuit 2, a control circuit 3 to control the respective circuits 1 and 2, a control line 4 to connect each of these circuits 1 to 3 to each other, a transmitting resonance frequency adjuster circuit 8, a common antenna 10, and a transmitting and receiving resonance frequency switching circuit 11.

The transmitting resonance frequency adjuster circuit 8 is connected in series to the common antenna 10 to lower impedance viewed from the reader/writer function circuit 2. The transmitting and receiving resonance frequency switching circuit 11 is connected in parallel to the common antenna 10 to change a transmitting and receiving resonance frequency based on a control signal 12 from the control circuit 3. A concrete example of the transmitting and receiving resonance frequency switching circuit 11 is shown in FIG. 4.

Figure 4:
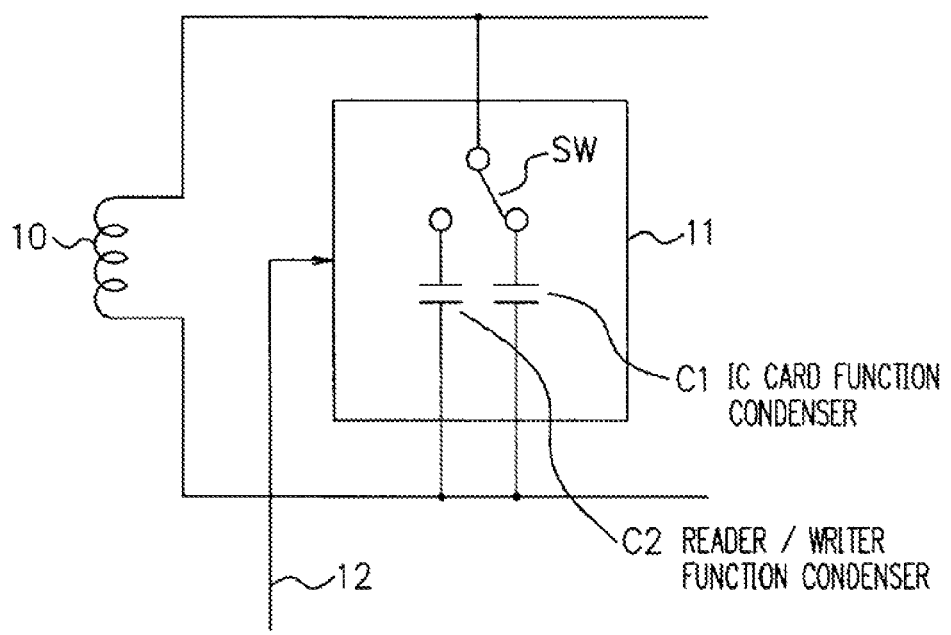
FIG. 4 is a diagram showing an example of the transmitting and receiving resonance frequency switching circuit.

In FIG. 4, a switch SW is controlled for a switching operation by the control signal 12 from the control circuit 3 and selects either one of condensers C1 and C2 to connect the selected one thereof in parallel to the common antenna 10. The condenser C1 is a condenser for the IC card function and the condenser C2 is a condenser for the reader/writer function.

A parallel resonance frequency of the condenser C1 and the common antenna 10 depends on the communication characteristic of the RF-ID device 100 and the external reader/writer device; hence, the value fic is determined to make the communication characteristic favorable. Based on this value fic, the condenser C1 for the IC card function is determined. On the other hand, when the condenser C2 for the reader/writer function has relatively small capacity, there is obtained a communication distance characteristic between the RF-ID device 100 and an external IC card (not shown); hence, the capacity value of the condenser C2 is determined at a point where the communication distance is favorable.

Description will be given of data communication in the operation for the IC card (RF-ID tag) function. In the operation, the common antenna 10 is automatically connected in parallel to the condenser C1 of the transmitting and receiving resonance frequency switching circuit 11. For example, in communication with an external reader/writer device employed in, for example, a wicket of a transport facility, data modulated in a predetermined modulation scheme is received via the common antenna 10 to be demodulated by the IC card function circuit 1 such that required data is sent via the control line 4 to the control circuit 3. A response from the IC card function circuit 1 to the external reader/writer device is carried out by using a load modulation different from the modulation scheme above.

Next, description will be given of data communication in the operation for the reader/writer function. In this operation, the common antenna 10 is automatically connected in parallel to the condenser C2 of the transmitting and receiving resonance frequency switching circuit 11. In communication with a general contactless IC card (RF-ID tag), modulated data modulated using the predetermined modulation scheme is outputted from the reader/writer function circuit 2 such that data is transferred via the common antenna 10 to the IC card. When conducting a response from the IC card using the load modulation, the response is received via the common antenna 10 by the IC card function circuit 1.

FIGS. 5 and 6 are diagrams to explain a method of mounting the common antenna 10 in which FIG. 5 is a perspective view thereof and FIG. 6 is a cross-sectional view thereof. As shown in these diagrams, the common antenna 10 can be produced using a Flexible Printed Circuit, (FPC), a printed board, copper wire, and the like. As shown in FIG. 5, the common antenna 10 is formed in the shape of a loop.

In a case wherein the RF-ID device 100 is mounted in a communication apparatus such as a portable communication terminal with a severe mounting condition, since the distance between the common antenna 10 and a printed board 20 on which circuits are installed is quite small, inductance of the common antenna 10 is influenced by ground wiring of the printed board 20; hence, a magnetic sheet 21 is arranged below the common antenna 10. Incidentally, in this example, although the common antenna 10 is disposed on the printed board 20, the common antenna 10 may also be arranged on metal such as a battery pack.

FIGS. 7 and 8 are diagrams showing another method of mounting the common antenna 10; FIG. 7 is a perspective view thereof and FIG. 8 is a cross-sectional view thereof. In both diagrams, the equivalent components are assigned with the same reference numerals. In this example, an opening is disposed in a central portion of the common antenna 10 and the magnetic sheet 21, and circuit parts 22 are mounted in the opening region. As a result, the inner portion of the loop of the antenna 10 can be effectively used, which is quite suitable for a small-sized communication apparatus.

In a case wherein the opening is disposed in the common antenna 10 and the magnetic sheet 21, the communication distance is deteriorated in the reader/writer function when compared with a case wherein the opening is not disposed as shown in FIGS. 5 and 6. This deterioration can be compensated by adjusting the capacity of the condenser C2 for the reader/writer function to make the communication distance favorable.

The present invention is applied to a communication apparatus including an IC card (RF-ID tag) function to achieve contactless communication of information with an external reader/writer device and a reader/writer function to carry out contactless communication of information with an external IC card and is additionally applicable to portable communication terminals (a cellular, a portable digital camera, a portable digital acoustic device, a Personal Digital Assistant (PDA), and the like) including the communication apparatus.

This application is based upon and claims the benefit of priority from Japanese patent application No. 2006-289335, filed on Oct. 25, 2006, the disclosure of which is incorporated herein in its entirety by reference.

DESCRIPTION OF REFERENCE NUMERALS

1 IC card (RF-ID tag) function circuit
2 Reader/writer function circuit
3 Control circuit
4 Control line
8 Transmitting resonance frequency adjuster circuit
10 Common (shared) antenna
11 Transmitting and receiving resonance frequency switching circuit
12 Control signal
20 Printed board
21 Magnetic sheet
100 RF-ID device SW Switch
C1, C2 Condenser

The invention claimed is:

1. A communication apparatus comprising:
a first communication function module for performing contactless communication with an external first contactless communication device;
a second communication function module for performing contactless communication with an external second contactless communication device;
a common antenna shared between the first and second communication function modules; and
a resonance frequency switching unit connected in parallel with the common antenna for changing a resonance frequency of the common antenna for each of the first and second communication function modules.

2. The communication apparatus in accordance with claim 1, wherein the resonance frequency switching unit automatically changes a resonance frequency at operation of each of the first and second communication function modules.

3. The communication apparatus in accordance with claim 1, wherein the first communication module is a radio frequency identification (RF-ID) tag and the second communication function module is a reader/writer device which communicates with an RF-ID tag.

4. The communication apparatus in accordance with claim 1, wherein the common antenna is in a shape of loop.

5. The communication apparatus in accordance with claim 4, wherein at least one of the first communication function module, the second communication function module and the resonance frequency switching unit is mounted in a loop of the common antenna.

6. The communication apparatus in accordance with claim 1, wherein the common antenna is mounted on a printed board with a magnetic material therebetween.

7. A portable communication terminal comprising a communication apparatus, which includes:
a first communication function module for performing contactless communication with an external first contactless communication device;
a second communication function module for performing contactless communication with an external second contactless communication device;
a common antenna shared between the first and second communication function modules; and
a resonance frequency switching unit connected in parallel with
the common antenna for changing a resonance frequency of the common antenna for each of the first and second communication function modules.

8. The portable communication terminal in accordance with claim 7, wherein the resonance frequency switching unit automatically changes a resonance frequency at operation of each of the first and second communication function modules.

9. The portable communication terminal in accordance with claim 7, wherein the first communication module is a radio frequency identification (RF-ID) tag and the second communication function module is a reader/writer device which communicates with an RF-ID tag.

10. The portable communication terminal in accordance with claim 7, wherein the common antenna is in a shape of loop.

11. The portable communication terminal in accordance with claim 10, wherein at least one of the first communication function module, the second communication function module and the resonance frequency switching unit is mounted in a loop of the common antenna.

12. The portable communication terminal in accordance with claim 7, wherein the common antenna is mounted on a printed board with a magnetic material therebetween.

13. A communication method comprising:
performing contactless communication with an external first contactless communication device;
performing contactless communication with an external second contactless communication device; and
performing contactless communication via a common antenna with the first and second contactless communication devices by changing a resonance frequency using a resonance frequency switching unit connected in parallel with the common antenna.

* * * * *